(12) United States Patent
Kim et al.

(10) Patent No.: US 9,798,414 B2
(45) Date of Patent: Oct. 24, 2017

(54) IMAGE DISPLAY APPARATUS

(71) Applicant: Samsung Display Co., Ltd., Yongin-si, Gyeonggi-do (KR)

(72) Inventors: Minseop Kim, Cheonan-si (KR); Soon-Sung Park, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 58 days.

(21) Appl. No.: 14/850,924

(22) Filed: Sep. 10, 2015

(65) Prior Publication Data

US 2016/0259469 A1 Sep. 8, 2016

(30) Foreign Application Priority Data

Mar. 2, 2015 (KR) .......................... 10-2015-029221

(51) Int. Cl.
| | |
|---|---|
| *G06F 3/041* | (2006.01) |
| *G06F 1/16* | (2006.01) |
| *G02F 1/1333* | (2006.01) |
| *H04N 5/645* | (2006.01) |

(52) U.S. Cl.
CPC .......... *G06F 3/0416* (2013.01); *G02F 1/1333* (2013.01); *G06F 1/16* (2013.01); *G06F 1/1637* (2013.01); *G06F 1/1643* (2013.01); *H04N 5/645* (2013.01); *G06F 2203/04102* (2013.01)

(58) Field of Classification Search
CPC . G06F 1/16; G06F 2203/04102; G06F 3/0416
See application file for complete search history.

(56) References Cited

U.S. PATENT DOCUMENTS

| | | | |
|---|---|---|---|
| 8,780,577 B2 | 7/2014 | Liao et al. | |
| 8,780,580 B2 | 7/2014 | Oohira | |
| 2013/0241855 A1* | 9/2013 | Kim | G06F 3/041 345/173 |
| 2013/0293816 A1* | 11/2013 | Jung | H01L 23/49827 349/139 |
| 2014/0145167 A1 | 5/2014 | Son | |
| 2014/0240933 A1 | 8/2014 | Lee et al. | |

FOREIGN PATENT DOCUMENTS

| | | |
|---|---|---|
| JP | 2013-003171 | 1/2013 |
| KR | 10-2012-0079677 | 7/2012 |
| KR | 10-2014-0067500 | 6/2014 |
| KR | 10-2014-0099174 | 8/2014 |

* cited by examiner

*Primary Examiner* — Viet Pham
(74) *Attorney, Agent, or Firm* — Lewis Roca Rothgerber Christie LLP

(57) ABSTRACT

An image display apparatus includes a display panel, a driver configured to drive the display panel, a flexible printed circuit board connecting the driver to the display panel; a buffer under the display panel and overlapping with the display panel and with a region of the flexible printed circuit board that is adjacent to a first side of the display panel in a first direction, and a first adhesive under the buffer and overlapping with a region of a first side of the buffer in the first direction.

20 Claims, 5 Drawing Sheets

IMAGE DISPLAY APPARATUS

CROSS-REFERENCE TO RELATED APPLICATION

This U.S. non-provisional patent application claims priority to and the benefit of Korean Patent Application No. 10-2015-0029221, filed on Mar. 2, 2015, the entire contents of which are hereby incorporated by reference.

BACKGROUND

1. Field

The present disclosure herein relates to an image display apparatus.

2. Description of the Related Art

An electronic device such as a smart phone, a smart watch, a digital camera, a laptop computer, a navigation device, or a smart TV that provides an image to a user includes an image display apparatus for displaying the image. The image display apparatus includes: a display panel for generating and displaying an image; and a drive unit for driving the display panel.

There are various types of display panels such as a liquid crystal display panel, an organic light emitting display panel, an electrowetting display panel, and an electrophoretic display panel that may be used as a display panel.

The drive unit for driving the display panel is mounted on a flexible printed circuit board to be able to be connected to the display panel. The drive unit is mounted on one side of the flexible printed circuit board, and another side of the flexible printed circuit board may be connected to the display panel. Because the flexible printed circuit board is curved so that the one side of the flexible printed circuit board is disposed on a back side of the display panel, the drive unit is disposed on the back side of the display panel.

SUMMARY

The present disclosure is directed to an image display apparatus capable of preventing or reducing a lift-off phenomenon of a flexible printed circuit board.

According to one or more exemplary embodiments of the present invention, an image display apparatus includes: a display panel; a driver configured to drive the display panel; a flexible printed circuit board connecting the driver to the display panel; a buffer under the display panel and overlapping with the display panel and with a region of the flexible printed circuit board adjacent to a first side of the display panel in a first direction; and a first adhesive under the buffer and overlapping with a region of a first side of the buffer in the first direction.

In some embodiments, the buffer may include: a first buffer overlapping with the display panel; and a second buffer extending from a region of a first side of the first buffer in the first direction. The second buffer may overlap with the region of the flexible printed circuit board that is adjacent to the first side of the display panel in the first direction.

In some embodiments, the length of the second buffer may be greater than or equal to the length of the flexible printed circuit board in a second direction crossing the first direction.

In some embodiments, the first adhesive may include: a first tape overlapping with a region of the first side of the first buffer in the first direction; a second tape extending from a region of a first side of the first tape in the first direction and overlapping with the second buffer; and an opening in a region of the first tape.

In some embodiments, a planar size of the second tape may be the same as a planar size of the second buffer.

In some embodiments, the flexible printed circuit board may be curved, and a region of a first side of the flexible printed circuit board may be attached to respective bottom surfaces of the first and second tapes, and a region of a second side of the flexible printed circuit board may be connected to a region of a top surface of the first side of the display panel.

In some embodiments, the driver may be under the flexible printed circuit board and adjacent to the first side of the flexible printed circuit board in the first direction and in the opening.

In some embodiments, the second buffer and the second tape may be adjacent to a curvature part of the flexible printed circuit board.

In some embodiments, the image display apparatus may further include a resin under the flexible printed circuit board between the first side of the display panel and the curvature unit.

In some embodiments, the first adhesive may include a double-sided tape.

In some embodiments, the image display apparatus may further include: a window on the display panel; a touch panel between the window and the display panel and configured to sense a user's touch, the touch panel being configured to provide an input signal to the driver; a second adhesive bonding the window to the touch panel; a third adhesive bonding the touch panel to the display panel; and a fourth adhesive bonding the display panel to the buffer.

In some embodiments, the second and third adhesives may include an optically clear adhesive.

In some embodiments, the display panel and the touch panel may be flexible.

In some embodiments, the buffer may be elastic.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
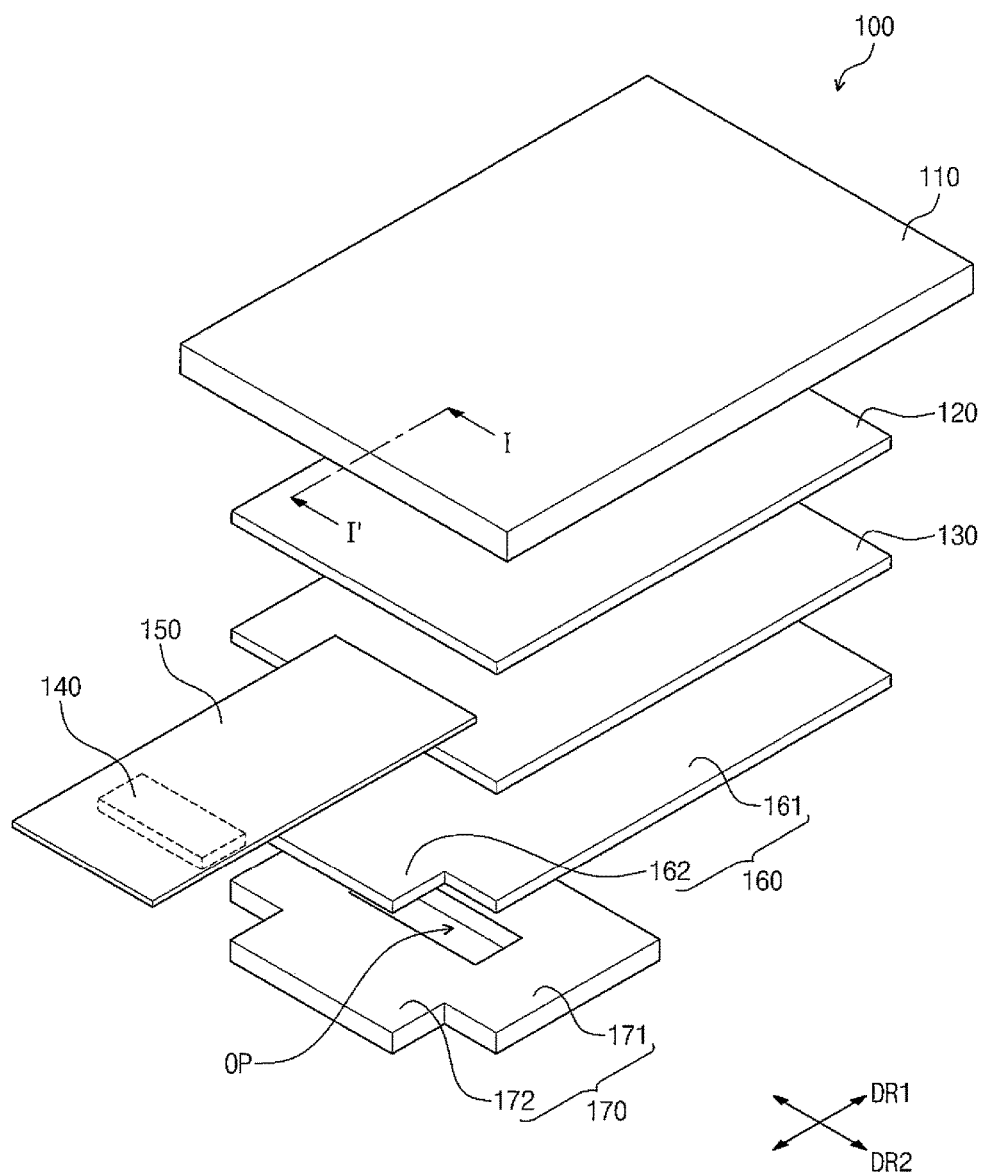
FIG. 1 is an exploded perspective view of an image display apparatus according to one or more exemplary embodiments of the present invention.

Aspects and features of the present invention, and implementation methods thereof will be clarified through description of the following exemplary embodiments described herein with reference to the accompanying drawings. The present invention may, however, be embodied in different forms and should not be construed as limited to the embodiments set forth herein. Rather, these embodiments are provided so that this disclosure is thorough and complete, and to fully convey the scope of the present invention to those skilled in the art. Further, the present invention is defined by the scope of the claims and their equivalents. Like reference numerals refer to like elements throughout. The terminology used herein is for the purpose of describing particular embodiments and is not intended to be limiting of the present invention. As used herein, the singular forms 'a' and 'an' are intended to include the plural forms as well, unless the context clearly indicates otherwise.

It will also be understood that when an element or a layer is referred to as being on,' 'connected to' or 'adjacent to' another element, it can be directly on, connected to, or adjacent to the other element or layer, or one or more intervening elements or layers may be present. When an element or layer is referred to as being 'directly on,' 'directly connected to', or 'immediately adjacent to' another element or layer, there are no intervening elements or layers present. As used herein, the term 'and/or' includes any and all combinations of one or more of the associated listed items.

Spatially relative terms, such as 'below', 'beneath', 'lower', 'bottom', 'above', 'upper', 'top' and the like, may be used herein for ease of description to describe one element or feature's relationship to another element(s) or feature(s) as illustrated in the figures. It will be understood that the spatially relative terms are intended to encompass different orientations of the device in use or operation in addition to the orientation illustrated in the figures. For example, if the device in the figures is turned over, elements described as "below" other elements or features would then be oriented "above" the other elements or features. Thus, the example term "below" can encompass both an orientation of above and below. The device may be otherwise oriented (e.g., rotated 90 degrees or at other orientations) and the spatially relative descriptors used herein should be interpreted accordingly.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the inventive concept refers to "one or more embodiments of the inventive concept." Also, the term "exemplary" is intended to refer to an example or illustration.

Although terms such as 'first' and 'second' may be used herein to describe various elements, components, and/or sections, the elements, components, and/or sections should not be limited by these terms. These terms are used to differentiate one element, component, and/or section from another one. Thus, a first element, component, and/or section discussed below could be termed a second element, component, or section without departing from the technical spirit of the present disclosure. The meaning of 'comprise', 'include', or 'have' specifies a property, a region, a fixed number, a step, a process, an element and/or a component but does not exclude other properties, regions, fixed numbers, steps, processes, elements and/or components.

Exemplary embodiments of the present disclosure are described herein with reference to plan illustrations and cross-sectional illustrations that are schematic illustrations of example embodiments of the present disclosure. As such, variations from the shapes of the illustrations as a result of manufacturing techniques and/or tolerances, for example, are to be expected. Thus, example embodiments of the present disclosure should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the present invention.

Hereinafter, exemplary embodiments of the present invention are described in detail with reference to the accompanying drawings.

Figure 2:
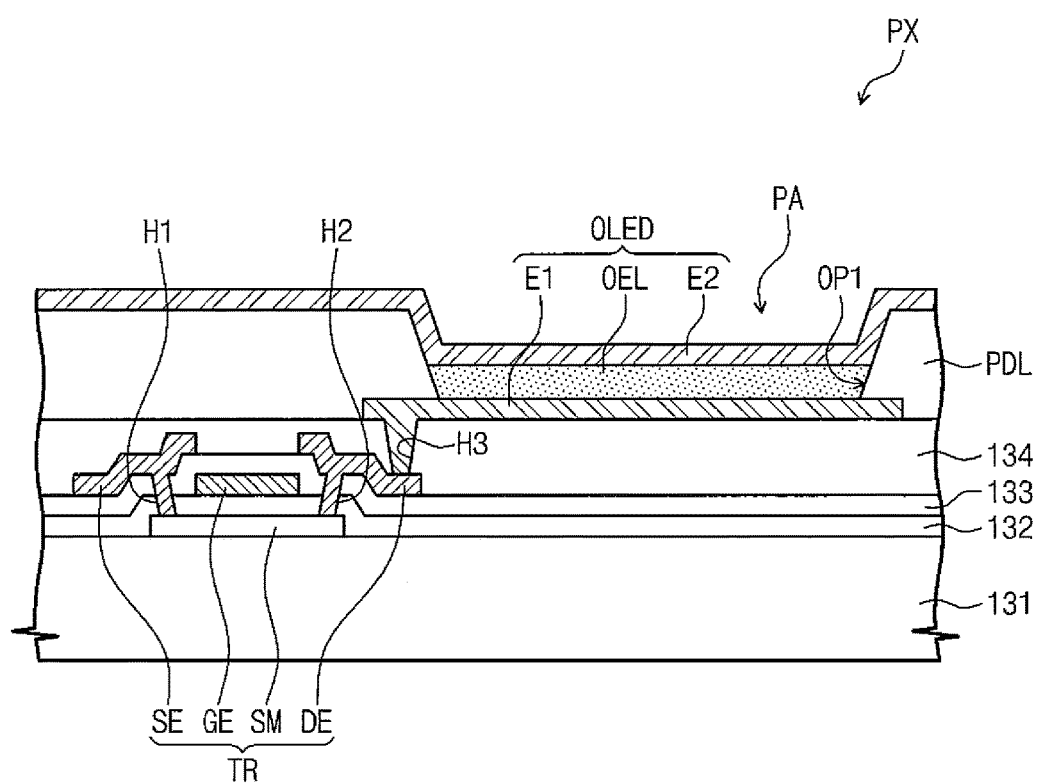
FIG. 2 is a cross-sectional view of a pixel disposed on a display panel of FIG. 1.
Figure 3:
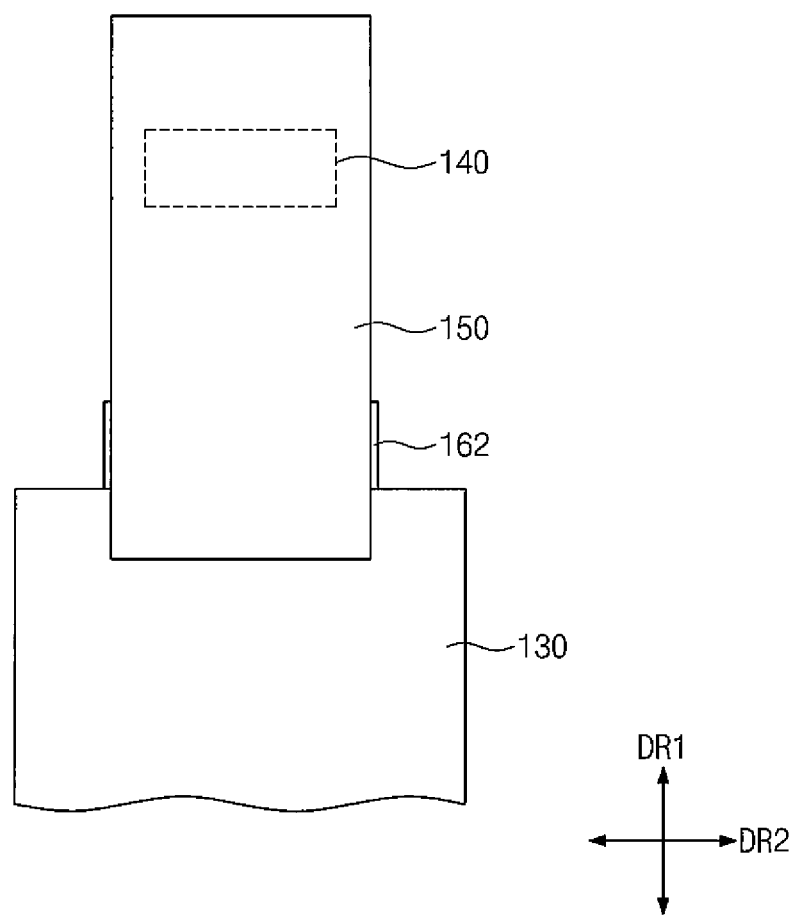
FIG. 3 is a plan view of a portion of a display panel of FIG. 1
Figure 4:
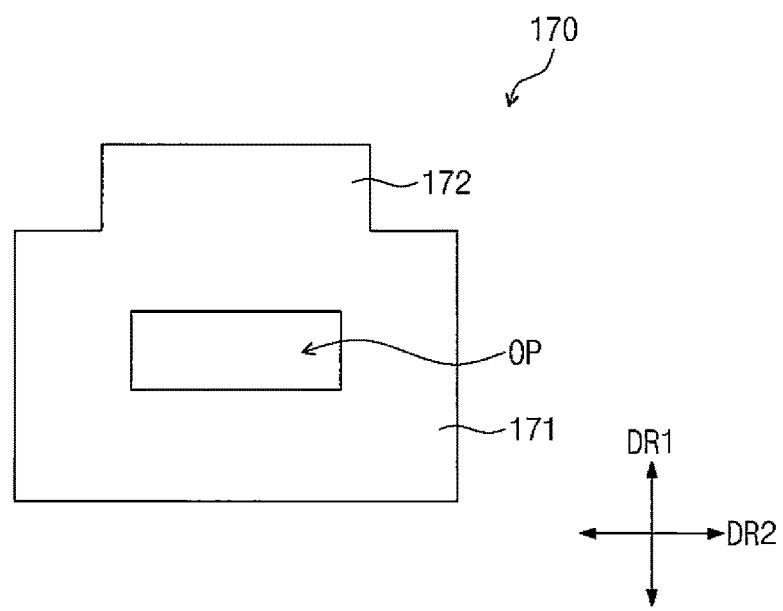
FIG. 4 is a plan view of a first adhesive of FIG. 1.

FIG. 1 is an exploded perspective view of an image display apparatus according to one or more embodiments of the present invention. FIG. 2 is a cross-sectional view of a pixel disposed on the display panel of FIG. 1. FIG. 3 is a plan view of a portion of the display panel of FIG. 1. FIG. 4 is a plan view of a first adhesive of FIG. 1.

Referring to FIG. 1, an image display apparatus 100 according to one or more embodiments of the present invention includes a window 110, a touch panel 120, a display panel 130, a drive unit (or driver) 140, a flexible printed circuit board 150, a buffer member (or buffer) 160, and a first adhesive member (or first adhesive) 170.

The window 110 is disposed on the touch panel 120 to protect the touch panel 120 (e.g., to protect the touch panel 120 from an external scratch). When the image display apparatus 100 does not include a touch function, the touch panel 120 may be omitted from the image display apparatus 100. As such, in some embodiments, the window 110 may be disposed on the display panel 130 to protect the display panel 130.

A planar size of the window 110 may be larger than a planar size of the touch panel 120 and a planar size of the display panel 130. The window 110, the touch panel 120, and the display panel 130 may each have relatively long sides in a first direction DR1 and may each have relatively short sides in a second direction DR2 crossing the first direction DR1.

The touch panel 120 may be disposed on the display panel 130. The touch panel 120 is an input device that may receive a user's command. When an input tool such as a user's hand and/or a touch pen touches the screen, an input signal may be received from the touch panel 120 to the display panel 130. For example, the input signal sensed by the touch panel 120 may be received by the driver 140, and the driver 140 may control the display panel 130 in response to the input signal so that the display panel 130 displays an image corresponding to the input signal.

The touch panel 120 may use, for example, a resistive overlay method, a capacitive overlay method, a surface acoustic wave method, an infrared method, and/or the like.

The display panel 130 generates an image (e.g., is configured to generate an image). The image generated by the display panel 130 passes through the window 110 to be provided to (or viewed by) a user. Various display panels such as a liquid crystal display panel, an organic light emitting display panel, an electrowetting display panel, and an electrophoretic display panel may be used as the display panel 130.

The driver 140 may be disposed under the flexible printed circuit board 150 (e.g., may be disposed at a predetermined region of the flexible printed circuit board 150) adjacent to one side (e.g., a first side) of the flexible printed circuit board 150 in the first direction DR1. The driver 140 may be mounted on the flexible printed circuit board 150 in a form of an integrated circuit chip. Another side (e.g., a second side opposite to the first side) of the flexible printed circuit board 150 may be connected to one side (e.g., a first side) of the display panel 130 in the first direction DR1 (e.g., a predetermined region of the second side of the flexible printed circuit board 150 may be connected to a predetermined region of the first side of the display panel 130 in the first direction DR1).

The driver 140 is connected to the display panel 130 through the flexible printed circuit board 150 to provide a control signal to the display panel 130 and to provide to the display panel 130 an image signal for driving the display panel 130. The display panel 130 is driven by the control signal and the image signal received from the driver 140 to display an image.

The driver 140 and the display panel 130 are connected to each other by wires disposed on the flexible printed circuit board 150. In addition, the display panel 130 includes a plurality of pixels for displaying an image. The pixels may display an image by using the image signals received from the driver 140.

When the display panel 130 is an organic light emitting diode panel, each of the pixels of the display panel 130 has a configuration of a pixel PX, illustrated in FIG. 2.

Referring to FIG. 2, the pixel PX includes an organic light emitting diode (or organic light emitting device) OLED and a transistor TR for driving the organic light emitting device OLED. The transistor TR is driven by a control signal that is received from the driver 140.

More specifically, the transistor TR is disposed on a substrate 131. The substrate 131 may be a transparent insulating substrate formed of glass, quartz, and/or ceramic, and/or may be a transparent flexible substrate formed of plastic. In addition, the base substrate 131 may be a metallic substrate formed of stainless steel.

When the substrate 131 is a flexible substrate, the display panel 130 may be a flexible display panel 130 having flexibility. Further, the touch panel 120 may be a flexible touch panel 120 including touch elements that are formed on a flexible substrate to sense a touch of a user's hand and/or a touch pen, etc.

The image display apparatus 100 may be a flexible image display apparatus including the flexible touch panel 120 and the flexible display panel 130.

A semiconductor layer SM of a transistor TR is disposed on the substrate 131. The semiconductor layer SM may include a semiconductor of an inorganic material such as amorphous silicon or polysilicon or an organic semiconductor. Further, the semiconductor layer SM may include an oxide semiconductor. Although not illustrated in FIG. 2, the semiconductor layer SM may include a source region, a drain region, and a channel region between the source and drain regions.

A first insulating film 132 may be disposed on the substrate 131 to cover the semiconductor layer SM. The first insulating film 132 may be an inorganic insulating film including an inorganic material.

A gate electrode GE of the transistor TR overlapping the semiconductor layer SM may be disposed on the first insulating film 132. In more detail, the gate electrode GE may be disposed to overlap the channel region of the semiconductor layer SM. The gate electrode GE is connected to a gate line applying on/off signals to the transistor TR.

A second insulating film 133 may be disposed on the first insulating film 132 so as to cover the gate electrode GE. The second insulating film 133 may be defined as an interlayer insulating film. The second insulating film 133 may be an inorganic insulating film including an inorganic material.

The source electrode SE and the drain electrode DE of the transistor TR are spaced apart from each other on the second insulating film 133. The source electrode SE may be connected to the source region of the semiconductor layer SM through a first contact hole H1 that is formed by penetrating the first and second insulating films 132 and 133. The drain electrode DE may be connected to the drain region of the semiconductor layer SM through a second contact hole H2 formed by penetrating the first and second insulating films 132 and 133.

A third insulating film 134 may be disposed on the second insulating film 133 so as to cover the source electrode SE and the drain electrode DE of the transistor TR. The third insulating film 134 may be an organic insulating film including an organic material.

The first electrode E1 of the organic light emitting diode OLED may be disposed on the third insulating film 134. The first electrode E1 may be connected to the drain electrode DE of the transistor TR through a third contact hole H3 that is formed by, for example, penetrating the third insulating film 134. The first electrode E1 may be formed as a pixel electrode or an anode electrode. The first electrode E1 may be formed as a transparent electrode or a reflective electrode.

A pixel defining layer PDL exposing a region (e.g., a predetermined region) of the first electrode E1 may be disposed on the first electrode E1 and the third insulating film 134. The pixel defining layer PDL includes a first open part (or a first opening) OP1 exposing a region (e.g., a predetermined region) of the first electrode E1. A region in which the first opening OP1 is disposed is defined as a pixel region PA.

An organic emission layer OEL may be disposed on the first electrode E1 in the first opening OP1. The organic emission layer OEL may include an organic material capable of generating any one of red, green, and blue lights. Therefore, the organic emission layer OEL may generate any one of red, green, and blue lights. In another embodiment, the organic emission layer OEL may generate a white light by a combination of organic materials generating red, green, and blue lights.

The organic emission layer OEL may be formed of a low molecule material or a high molecule material. The organic emission layer OEL may have a multi-layer structure including a hole injection layer (HIL), a hole transporting layer (HTL), an emission layer (EML), an electron transporting layer (ETL), and an electron injection layer (EIL). In one or more exemplary embodiments, the hole injection layer may be disposed on the first electrode E1, and the hole transporting layer, the emission layer, the electron transporting layer, and the electron injection layer may be sequentially stacked on the hole injection layer.

The second electrode E2 may be disposed on the pixel defining layer PDL and the organic emission layer OEL. The second electrode E2 may be defined as a common electrode or a cathode electrode. The second electrode E2 may be formed as a transparent electrode or as a reflective electrode.

When the display panel 130 is a top emission type organic light emitting display panel, the first electrode E1 may be formed as a reflective electrode, and the second electrode E2 may be formed as a transmissive electrode. When the display panel 130 is a bottom emission type organic light emitting display panel, the first electrode E1 may be formed as a transmissive electrode, and the second electrode E2 may be formed as a reflective electrode.

The organic light emitting device OLED is formed by the first electrode E1, the organic emission layer OEL, and the second electrode E2 in the pixel region PA. That is, the organic light emitting device OLED is formed in the pixel region PA, and includes the first electrode E1, the organic emission layer OEL, and the second electrode E2 in the pixel region PA.

The first electrode E1 may be a cathode that is a hole injection electrode and the second electrode E2 may be an anode that is an electron injection electrode. However, in some embodiments, according to a driving method of the organic light emitting display panel, the first electrode E1 may be an anode and the second electrode E2 may be a cathode.

A driving power for allowing the organic emission layer OEL of the organic light emitting device OLED to emit light by the transistor TR is applied to the first electrode E1, and power of an opposite polarity relative to the driving power (or ground) is applied to the second electrode E2. The driving power applied to the first electrode E1 may be a power corresponding to an image signal.

In one or more embodiments, holes and electrons injected into the organic light emitting layer OEL are combined to generate excitons, and the organic light emitting device OLED emits light as the excitons fall to a ground state. The organic light emitting device OLED emits red, green, or blue light according to a current flow to display image information (e.g., predetermined image information).

Referring to FIGS. 1 and 3, the buffer 160 may be disposed under the display panel 130. The buffer 160 overlaps with the display panel 130 and a region (e.g., a predetermined region) of the flexible printed circuit board 150 adjacent to the first side of the display panel 130 in the first direction DR1.

The buffer 160 may be elastic (e.g., may have a predetermined elasticity), and may protect a back (or bottom) surface of the display panel 130. For example, the buffer 160 may include a material such as a sponge.

The buffer 160 may include a first buffer member (or a first buffer) 161 and a second buffer member (or a second buffer) 162 projecting (or extending) from a region (e.g., a predetermined region) of one side (e.g., a first side) of the first buffer 161 in the first direction DR1. The first buffer 161 may be disposed under the display panel 130 so as to overlap with the display panel 130. The second buffer 162 may be disposed to overlap with a region (e.g., a predetermined region) of the flexible printed circuit board 150 adjacent to the first side of the display panel 130 in the first direction DR1.

In one or more embodiments, the second buffer 162 may be longer than the flexible printed circuit board 150 in the second direction DR2. In other words, a length of the second buffer 162 in the second direction DR2 may be greater than a length of the flexible printed circuit board 150 in the second direction DR2. In another embodiment, the length of the second buffer 162 may be the same as that of the flexible printed circuit board 150.

Referring to FIGS. 1 and 4, the first adhesive 170 may be disposed under the buffer 160. The first adhesive 170 is disposed so as to overlap with a region (e.g., a predetermined region) of one side (e.g., a first side) of the buffer 160 in the first direction DR1. The first adhesive 170 may include a double-sided tape, for example.

The first adhesive 170 may include a first tape 171, a second tape 172 projecting (or extending) from a region (e.g., a predetermined region) of one side (e.g., a first side) of the first tape 171 in the first direction DR1, and an open part (or an opening) OP that is formed, for example, by penetrating a region (e.g., a predetermined region) of the first tape 171.

The first tape 171 is disposed so as to overlap with a region (e.g., a predetermined region) of the first side of the first buffer 161 in the first direction DR1. The second tape 172 is disposed so as to overlap with the second buffer 162. The second tape 172 may have the same planar size as the second buffer 162. When the flexible printed circuit board 150 is curved, the driver 140 on the flexible printed circuit board 150 is inserted into the opening OP.

The image display apparatus 100 may further include a bottom case accommodating the touch panel 120, the display panel 130, the buffer 160, and the first adhesive 170. The window 110 may be disposed so as to cover a top part of the bottom case accommodating the touch panel 120, the display panel 130, the buffer 160, and the first adhesive 170.

Figure 5:
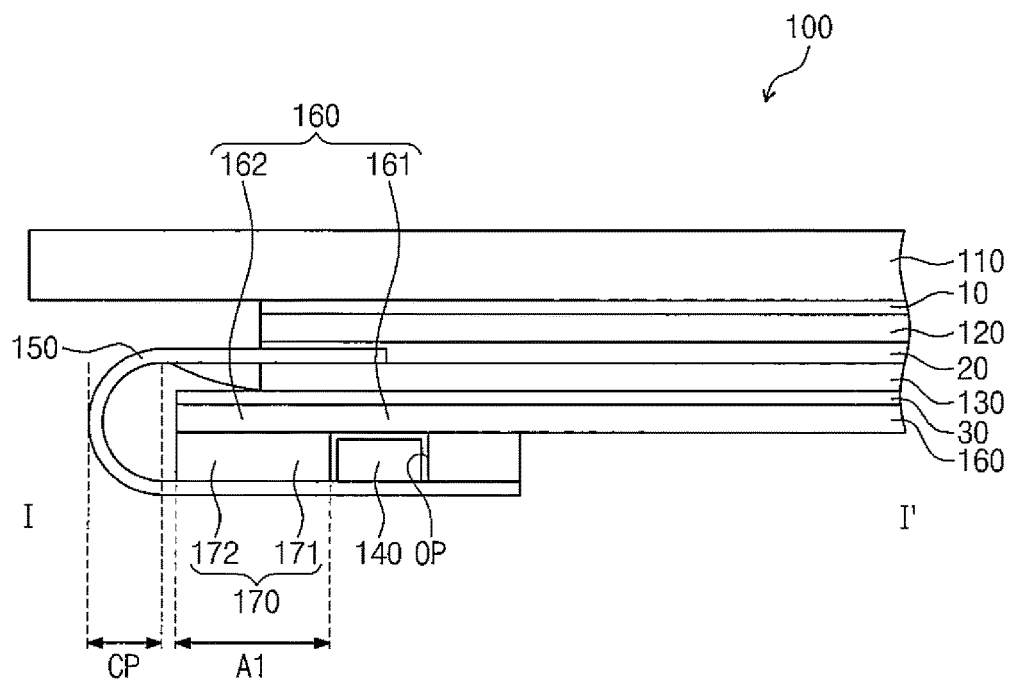
FIG. 5 is a sectional view taken along the line I-I' of FIG. 1.

FIG. 5 is a cross-sectional view taken along the line I-I' of FIG. 1.

Referring to FIG. 5, the window 110 and the touch panel 120 may be bonded to each other by a second adhesive member (or a second adhesive) 10. The second adhesive 10 is disposed between the window 110 and the touch panel 120 and bonds a bottom surface of the window 110 and a top surface of the touch panel 120 to connect the window 110 and the touch panel 120 to each other.

The touch panel 120 and the display panel 130 may be bonded to each other by a third adhesive member (or a third adhesive) 20. The third adhesive 20 is disposed between the touch panel 120 and the display panel 130 and bonds a bottom surface of the touch panel 120 and a top surface of the display panel 130 to connect the touch panel 120 and the display panel 130 to each other.

The third adhesive 20 is disposed so as to overlap with a region (e.g., a predetermined region) of the second side of the flexible printed circuit board 150 that is connected to a region (e.g., a predetermined region) of the first side of the display panel 130 in the first direction DR1. Therefore, the third adhesive 20 may bond a region of the second side of the flexible printed circuit board 150 to the touch panel 120.

The second and third adhesives 10 and 20 may be ultraviolet curable resins. The second and third adhesives 10 and 20 may include an optically clear adhesive (OCA).

The display panel 130 and the buffer 160 may be bonded to each other by a fourth adhesive member (or a fourth adhesive) 30. The buffer 160 may be bonded to the display panel 130 by the fourth adhesive 30 to be able to be connected thereto.

As described above, the first buffer 161 may be disposed so as to overlap with the display panel 130. The second buffer 162 extends outside of (or past) the display panel 130 in the first direction DR1 to be disposed so as to overlap with a region (e.g., a predetermined region) of the flexible printed circuit board 150 that is adjacent to the first side of the display panel 130.

A top surface of the first adhesive 170 may be disposed so as to overlap with a region (e.g., a predetermined region) of the first side of the buffer 160 in the first direction to be bonded to a region (e.g., a predetermined region) of the first side of the buffer 160.

The flexible printed circuit board 150 is curved (e.g., is configured to be curved), and a region (e.g., a predetermined region) of the first side of the flexible printed circuit board 150 is disposed under the first adhesive 170 in the first direction DR1. A region (e.g., a predetermined region) of the first side of the flexible printed circuit board 150 is disposed so as to overlap with the first adhesive 170 to be bonded to a bottom surface of the first adhesive 170. As such, the driver 140 on the flexible printed circuit board 150 may be inserted into the opening OP of the first adhesive 170.

As described above, the second tape 172 is disposed so as to overlap with the second buffer 162. Therefore, the second tape 172 may extend outside of the display panel 130 in the first direction DR1 to be disposed so as to overlap with a region (e.g., a predetermined region) of the flexible printed circuit board 150 adjacent to the first side of the display panel 130.

Hereinafter, a curved region of the curved flexible printed circuit board 150 is referred to as a curvature part CP. That is, the curvature part CP is defined as a region in which the flexible printed circuit board 150 is curved to form a curvature. In addition, a region of the flexible printed circuit board 150 that is bonded to a bottom surface of the second tape 172 is referred to herein as a first region A1.

A resin R may be disposed under the flexible printed circuit board 150 between the first side of the display panel 130 and the curvature part CP in the first direction DR1. The resin R may be an adhesive member and may be an ultraviolet curable resin. The resin R may protect and cover a wire disposed under the flexible printed circuit board 150 between the first side of the display panel 130 and the curvature part CP.

When the buffer 160 does not include the second buffer 162 and when the first adhesive 170 does not include the second tape 172, a curvature may form up to the first region A1 of the flexible printed circuit board 150 because the flexible printed circuit board 150 is resilient (e.g., because the flexible printed circuit board 150 has a predetermined resilience). As such, a region (e.g., a predetermined region) of the flexible printed circuit board 150 that should be bonded to a region (e.g., a predetermined region) of the first tape 171 adjacent to the first region A1 may be lifted off without being bonded thereto.

However, in the image display apparatus 100 according to one or more embodiments of the present invention, the second buffer 162 and the second tape 172 extending outside of the display panel 130 in the first direction DR1 extend so as to be adjacent to the curvature part of the curved flexible printed circuit board 150. Therefore, the second buffer 162 extending from the first buffer 161 and the second tape 172 extending from the first tape 171 are each disposed so as to overlap the first region A1 of the flexible printed circuit board 150.

The second tape 172 is rigidly (or substantially rigidly) bonded to the bottom surface of the second buffer 162 and the first region A1 of the flexible printed circuit board 150 is rigidly (or substantially rigidly) bonded to the bottom surface of the second tape 172. Because the first region A1 of the flexible printed circuit board 150 is bonded to the second tape 172, the first region A1 of the flexible printed circuit board 150 does not have a curvature. Accordingly, the lift-off phenomenon of the flexible printed circuit board 150 may be prevented or reduced.

As a result, the image display apparatus 100 according to one or more embodiments of the present invention may prevent or reduce the lift-off phenomenon of the flexible printed circuit board 150.

Figure 6:
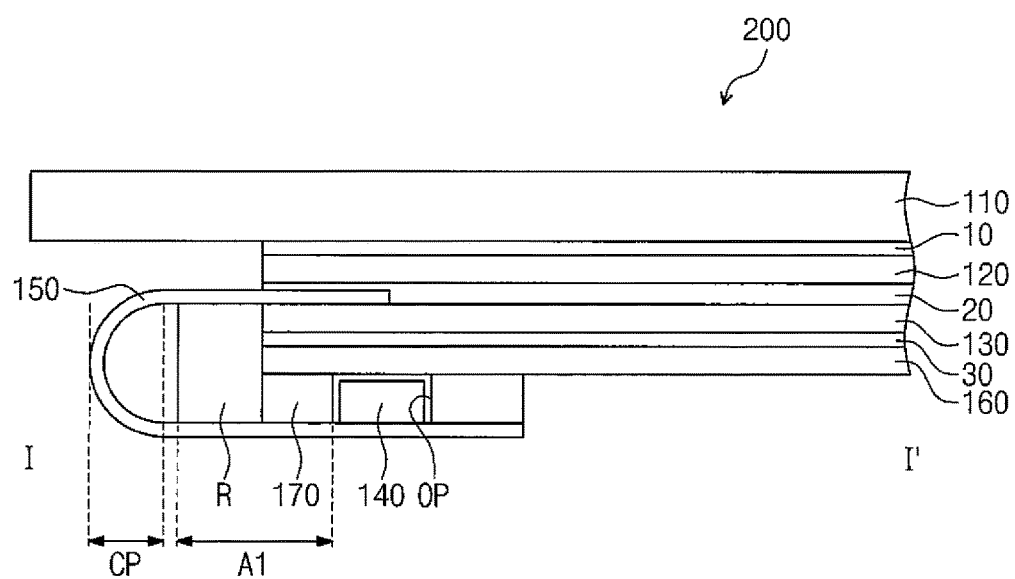
FIG. 6 is a cross-sectional view of an image display apparatus according to one or more exemplary embodiments of the present invention.

FIG. 6 is a cross-sectional view of an image display apparatus 200 according to one or more embodiments of the present invention.

FIG. 6 is a cross-sectional view taken along the line I-I' illustrated in FIG. 1. The image display apparatus 200 illustrated in FIG. 6 has a configuration that is substantially the same as the configuration of the image display apparatus 100 illustrated in FIG. 5, except for the configurations of the resin R, the buffer 160, and the first adhesive 170. Therefore, the elements of the image display apparatus 200 having a configuration different from the configuration of the image display apparatus 100 illustrated in FIG. 5 are described below.

Referring to FIG. 6, a buffer 160 may be disposed under the display panel 130 so as to overlap with the display panel 130. A first adhesive 170 may be disposed under the buffer 160 so as to overlap with a region (e.g., a predetermined region) of a first side of the buffer 160 in the first direction DR1. That is, the second buffer 162 and the second tape 172 illustrated in FIG. 5 are not used in the image display apparatus 200, illustrated in FIG. 6.

The flexible printed circuit board 150 may be curved (e.g., may be configured to be curved), and a region (e.g., a predetermined region) of the first side of the flexible printed circuit board 150 may be bonded to a bottom surface of the first adhesive 170 in the first direction DR1. A region (e.g., a predetermined region) of the second side of the flexible printed circuit board 150 may be connected to a top surface of a region (e.g., a predetermined region) of the first side of the display panel 130 in the first direction DR1.

The first adhesive 170 may include an open part (or an opening) OP that is formed, for example, by penetrating a region (e.g., a predetermined region) of the first adhesive 170. The driver 140 may be disposed under the flexible printed circuit board 150 adjacent to the first side of the flexible printed circuit board 150 to be inserted into the opening OP.

A resin R may be disposed from the first side of the display panel 130, the first side of the buffer 160, and a first side of the first adhesive 170 to a region (e.g., a predetermined region) of the flexible printed circuit board 150 adjacent to the respective first sides of the display panel 130, the buffer 160, and the first adhesive 170.

The resin R may be disposed at a region of the flexible printed circuit board 150 adjacent to a curvature part CP. That is, the resin R is disposed so as to overlap at least a portion of the first region A1 of the flexible printed circuit board 150. The first region A1 of the flexible printed circuit board 150 may be bonded to the resin R.

Because the first region A1 of the flexible printed circuit board 150 is bonded to the resin R, the first region A1 of the flexible printed circuit board 150 does not have a curvature. Accordingly, the lift-off phenomenon of the flexible printed circuit board 150 may be prevented or reduced.

As a result, the display device 200 according to one or more embodiments of the present invention may prevent or reduce the lift-off phenomenon of the flexible printed circuit board 150.

As described above, an image display apparatus according to one or more exemplary embodiments of the present invention may prevent or substantially prevent a lift-off phenomenon of a flexible printed circuit board.

Example embodiments have been disclosed herein, and although specific terms are employed, they are used and are to be interpreted in a generic and descriptive sense only and not for purpose of limitation. In some instances, as would be apparent to one of ordinary skill in the art at the time of invention, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims, and their equivalents.

What is claimed is:

1. An image display apparatus comprising:
   a display panel;
   a driver configured to drive the display panel;
   a flexible printed circuit board connecting the driver to the display panel;
   a buffer under the display panel and overlapping with the display panel and with a region of the flexible printed circuit board that is adjacent to a first side of the display panel in a first direction; and
   a first adhesive under the buffer and overlapping with a region of a first side of the buffer in the first direction,
   wherein the flexible printed circuit board is curved, the driver is disposed under the buffer, and the first side of the buffer and a first side of the first adhesive are closer to a curvature part of the flexible printed circuit board than a boundary of the display panel.

2. The image display apparatus of claim 1, wherein the buffer comprises:
   a first buffer overlapping with the display panel; and
   a second buffer extending from a region of a first side of the first buffer in the first direction,
   wherein the second buffer overlaps with the region of the flexible printed circuit board that is adjacent to the first side of the display panel in the first direction.

3. The image display apparatus of claim 2, wherein a length of the second buffer is greater than or equal to a length of the flexible printed circuit board in a second direction that is perpendicular to the first direction.

4. The image display apparatus of claim 2, wherein the first adhesive comprises:
   a first tape overlapping with a region of the first side of the first buffer in the first direction;
   a second tape extending from a region of a first side of the first tape in the first direction and overlapping with the second buffer; and
   an opening in a region of the first tape.

5. The image display apparatus of claim 4, wherein a planar size of the second tape is the same as a planar size of the second buffer.

6. The image display apparatus of claim 4,
   wherein a region of a first side of the flexible printed circuit board is attached to respective bottom surfaces of the first and second tapes, and
   wherein a region of a second side of the flexible printed circuit board is connected to a region of a top surface of the first side of the display panel.

7. The image display apparatus of claim 6, wherein the driver is under the flexible printed circuit board and adjacent to the first side of the flexible printed circuit board in the first direction and in the opening.

8. The image display apparatus of claim 6, wherein the second buffer and the second tape are adjacent to the curvature part of the flexible printed circuit board.

9. The image display apparatus of claim 8, further comprising a resin under the flexible printed circuit board between the first side of the display panel and the curvature part in the first direction.

10. The image display apparatus of claim 1, wherein the first adhesive comprises a double-sided tape.

11. The image display apparatus of claim 1, further comprising:
    a window on the display panel;
    a touch panel between the window and the display panel and configured to sense a user's touch, the touch panel being configured to provide a signal to the driver as an input signal upon sensing the user's touch;
    a second adhesive bonding the window to the touch panel;
    a third adhesive bonding the touch panel to the display panel; and
    a fourth adhesive bonding the display panel to the buffer.

12. The image display apparatus of claim 11, wherein the second and third adhesives comprise an optically clear adhesive.

13. The image display apparatus of claim 11, wherein the display panel and the touch panel are flexible.

14. The image display apparatus of claim 1, wherein the buffer is elastic.

15. An image display apparatus comprising:
    a display panel;
    a driver configured to drive the display panel;
    a flexible printed circuit board connecting the driver to the display panel;
    a buffer under the display panel and overlapping with the display panel;
    a first adhesive under the buffer and overlapping with a region of a first side of the buffer in a first direction; and
    a resin from a first side of the display panel, a first side of the buffer, and a first side of the first adhesive to a region of the flexible printed circuit board adjacent to the first sides of the display panel, the buffer, and the first adhesive in the first direction,
    wherein the flexible printed circuit board is curved, the driver is disposed under the buffer, and the first side of the buffer and the first side of the first adhesive are closer to a curvature part of the flexible printed circuit board than a boundary of the display panel.

16. The image display apparatus of claim 15,
    wherein a region of a first side of the flexible printed circuit board is attached to a bottom surface of the first adhesive in the first direction, and
    wherein a region of a second side of the flexible printed circuit board is connected to a region of a top surface of the first side of the display panel.

17. The image display apparatus of claim 16, wherein the first adhesive further comprises an opening at a region of the first adhesive, and
    wherein the driver is under the flexible printed circuit board, adjacent to the first side of the flexible printed circuit board in the first direction, and in the opening.

18. The image display apparatus of claim 16, wherein the resin is at a region of the flexible printed circuit board adjacent to a curvature part of the flexible printed circuit board.

19. The image display apparatus of claim 15, further comprising:
    a window on the display panel;
    a touch panel between the window and the display panel and configured to sense a user's touch, the touch panel being configured to provide a signal to a drive unit as an input signal upon sensing the user's touch;
    a second adhesive bonding the window to the touch panel;
    a third adhesive bonding the touch panel to the display panel; and
    a fourth adhesive bonding the display panel to the buffer.

20. The image display apparatus of claim 19, wherein the display panel and the touch panel are flexible and the buffer is elastic.

* * * * *